(12) United States Patent
Inada (10) Patent No.: US 7,859,694 B2
(45) Date of Patent: Dec. 28, 2010

(54) DATA PROCESSING DEVICE

(75) Inventor: Hajime Inada, Chiryu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1304 days.

(21) Appl. No.: 10/809,406

(22) Filed: Mar. 26, 2004

(65) Prior Publication Data

US 2004/0246762 A1 Dec. 9, 2004

(30) Foreign Application Priority Data

Mar. 28, 2003 (JP) .......................... P2003-092431

(51) Int. Cl.
*G06F 3/12* (2006.01)
*G06K 15/10* (2006.01)
(52) U.S. Cl. ....................... 358/1.15; 358/1.16; 358/1.5
(58) Field of Classification Search ................ 358/1.15, 358/1.16, 1.9, 1.5, 1.13, 1.14, 524, 402, 403, 358/438, 442, 443; 360/12; 707/1, 2, 3, 707/9, 10; 717/168, 169, 174, 175
See application file for complete search history.

(56) References Cited

U.S. PATENT DOCUMENTS

| | | | |
|---|---|---|---|
| 5,930,004 A | 7/1999 | Imai et al. | 358/442 |
| 6,111,659 A * | 8/2000 | Murata | 358/296 |
| 6,359,699 B1 * | 3/2002 | Yoneta et al. | 358/1.16 |
| 6,763,399 B2 * | 7/2004 | Margalit et al. | 710/13 |
| 7,375,835 B1 * | 5/2008 | Hull et al. | 358/1.15 |
| 2001/0043344 A1 | 11/2001 | Imai et al. | 358/1.9 |
| 2002/0093669 A1 | 7/2002 | Campbell et al. | 358/1.9 |
| 2003/0035124 A1 * | 2/2003 | Tomita et al. | 358/1.8 |

FOREIGN PATENT DOCUMENTS

| | | |
|---|---|---|
| EP | 0 679 012 A2 | 10/1995 |
| EP | 0 891 073 A2 | 1/1999 |
| EP | 0 998 140 A1 | 5/2000 |
| JP | A 10-078812 | 3/1998 |
| JP | A 11-096103 | 4/1999 |
| JP | A 2000-112666 | 4/2000 |
| JP | 2001-282694 | 10/2001 |
| JP | A 2003-036238 | 2/2003 |

* cited by examiner

*Primary Examiner*—James A Thompson
(74) *Attorney, Agent, or Firm*—Oliff & Berridge, PLC (57) ABSTRACT

To provide a technology enabling a terminal device to use various functions provided in a data processing device without the use of a device driver. A multifunction device executes a process for implementing a function indicated by instruction data when such instruction data is stored in a shared area of the RAM. Here, the shared area of the RAM in which the instruction data is stored can be recognized by a personal computer connected to the multifunction device as a storage area that can be accessed through the file system, which is a function provided as a standard feature of the operating system. Accordingly, operations of the multifunction device can be controlled from the personal computer end simply by storing instruction data in the shared area via the operating system, eliminating the need for a special device driver to control the operations of the multifunction device.

13 Claims, 8 Drawing Sheets

```
<Scanner>
Color Type;     24bitColor
Resolution;     300 × 300dpi
Scan area;      0:0, 1500:1800
Brightness;     0
Contrast;       0
```

FIG.3(b)

```
<Set Auto Dial>
Dial1;   123-456-7890,FAX/TEL,XXX
Dial2;   012-345-6789,FAX/TEL,YYY
Dial3;   901-234-5678,TEL,ZZZ
              ⋮
<Scanner>
Color Type;     24bitColor
Resolution;     300 × 300dpi
Scan Area;      0:0, 1500:1800
Brightness;     0
Contrast;       0
              ⋮
<Printer>
QUALITY;        AUTO
CONTRAST;       AUTO
              ⋮
```

DATA PROCESSING DEVICE

BACKGROUND OF THE INVENTION

1. Field of the Invention

The present invention relates to a data processing device for receiving remote commands and executing a process to implement a function from among one or more functions. The invention also relates to a terminal device used when connected to and capable of performing data communications with the data processing device.

2. Description of the Related Art

Data processing devices having one or more functions, such as a printer function and a scanner function, are well known in the art. Normally, this type of data processing device is configured to receive commands from a terminal device and to implement various functions.

In order to use the various functions possessed by the data processing device, it has been necessary to provide the terminal device with an application program for providing a user interface to use the various functions and a special device driver for controlling the operations of the data processing device itself. The user of the terminal device launches the above application program and performs an operation corresponding to the desired function to control the operations of the data processing device via the device driver. In this way, the user can use the various functions.

In recent years, various technologies have been proposed for improving user-friendliness (the user interface) in this type of data processing device. For example, one such data processing device (facsimile machine A) includes a storage unit (RAM 12) that a terminal device (personal computer PC) can recognize as an external storage device connected to the terminal device itself as disclosed in Japanese patent application publication No. 2001-282694. When the terminal device stores data in this storage unit, the user is prompted to select a function to use for processing the data, and the data is processed based on the selected function. After the user selects a function in this data processing device, an instruction indicating the selected function is transmitted to the data processing device via a device driver (driver program) installed on the terminal device end.

Since the various functions possessed by the data processing device are used from the terminal device end in this type of data processing device, it is necessary to exchange commands directly between the terminal device and the data processing device via a special device driver.

Normally, the device driver is developed and provided in conjunction with the operating system (OS) incorporated on the terminal device end. Hence, the device driver must be updated when the OS is updated, or else the data processing device may not operate properly. The work required to upgrade the device driver can be extremely troublesome and a great burden on the user. Further, the party that develops and provides the data processing device must expend a large development cost in order to develop and upgrade the device driver for each OS and each time the OS is upgraded.

Therefore, there has been great demand in recent years for a technology to enable use of functions possessed by the data processing device without going through a device driver.

SUMMARY OF THE INVENTION

In view of the foregoing, it is an object of the present invention to provide a technology capable of using functions possessed by the data processing device without employing a device driver.

According to one aspect of the invention, there is provided a data processing device having one or more functions. The device includes a storing unit that stores various types of data and is capable of being recognized as an external storage device by a terminal device connected to and capable of performing data communications with the data processing device; and a function implementing unit that executes a process to implement one of the one or more functions that is indicated by instruction data when the instruction data is stored in the storing unit.

In the data processing device having this construction, a process is executed to implement the function indicated by the instruction data when such instruction data is stored in the storing unit. Here, the storing unit in which the instruction data is stored is recognized by the terminal device connected to the data processing device as a storage area that can be accessed (data storage and deletion) via a function (file system) provided in the OS (operating system) as a standard function. That is, the terminal device recognizes the storing unit as an external storage device connected to the terminal device itself. Therefore, the terminal device can control operations of the data processing device simply by storing instruction data in the storing unit via the OS. Hence, a special driver is not needed to control operations of the data processing device.

In this way, functions possessed by the data processing device can be used on the terminal device end without need for a device driver after simply providing a function for generating instruction data (such as incorporating a program or the like for providing a user interface to generate instruction data). Accordingly, there is no need for troublesome operations that accompany the installation of device drivers, thereby greatly reducing the load on the user in using the data processing device.

Further, since the operations of the data processing device can be controlled by a function provided standard in the OS, as described above, the party that develops and provides' the data processing device need only develop and provide a function to generate instruction data, thereby reducing developing costs associated with a device driver.

In particular, a special device driver and a function for generating the aforementioned instruction data was conventionally not developed nor provided for operating systems having few users because of the difficulty in recovering production costs for such development and provision. Therefore, terminal devices running such operating systems could not use the functions possessed by the data processing device. However, by developing and providing the programs described above for even those operating systems with few users, the aforementioned production costs can be reduced, and terminal devices running such operating systems can also use the functions of the data processing device.

The function implementing unit described above executes a process for implementing a function indicated by instruction data when such instruction data is stored in the storing unit. Accordingly, there is no possibility that the same process will be repeated undesirably based on the same instruction data when instruction data is left in the storing unit. Therefore, the following construction may be employed to prevent the same process from being repeated undesirably.

For example, instruction data modification commanding unit may be provided for modifying instruction data to indicate when a function has already been implemented by the function implementing unit, and the function implementing unit does not execute a process to implement a function indicated by the instruction data when the instruction data indicates that the function has already been implemented.

This construction can prevent the same process from being repeated undesirably based on the same instruction data. With this construction, "indicating that a function has already been implemented" can be achieved by overwriting part of the instruction data with content indicating that the function has already been implemented, or appending data indicating that the function has already been implemented to the instruction data.

According to another aspect of the invention, there is provided a storage medium that stores a program for controlling a data processing device that is connected in use to a terminal device so as to be capable of performing data communications therebetween. The programs stored in the storage medium are:

a program of enabling the terminal device to recognize a data storing unit of the data processing device as an external storage device so as to enable the terminal device to be accessible to the data storing unit; and a program of executing a process to implement a function of the data processing device that is indicated by instruction data when the instruction data is stored in the storing unit.

According to still another aspect of the invention, there is provided a storage medium that stores a program for controlling a terminal device that is connected in use to a data processing device so as to be capable of performing data communications therebetween. The programs stored in the storage medium are:

a program of enabling the terminal device to recognize a data storing unit of the data processing device as an external storage device so as to enable the terminal device to be accessible to the data storing unit;

a program of receiving user operations and generating instruction data instructing the data processing device to implement a function; and a program of storing the instruction data in the storing unit.

BRIEF DESCRIPTION OF THE DRAWINGS

In the accompanying drawings:

FIG. 2(*a*) is a first-half of a flowchart showing steps in a process to use the scanner function;

FIG. 2(*b*) is a second-half of a flowchart showing steps in a process to use the scanner function;

FIG. 3(*a*) shows the structure of content notification data;

FIG. 3(*b*) shows another structure of content notification data;

DETAILED DESCRIPTION OF THE PREFERRED EMBODIMENTS

Next a preferred embodiment of the present invention will be described.

Figure 1:
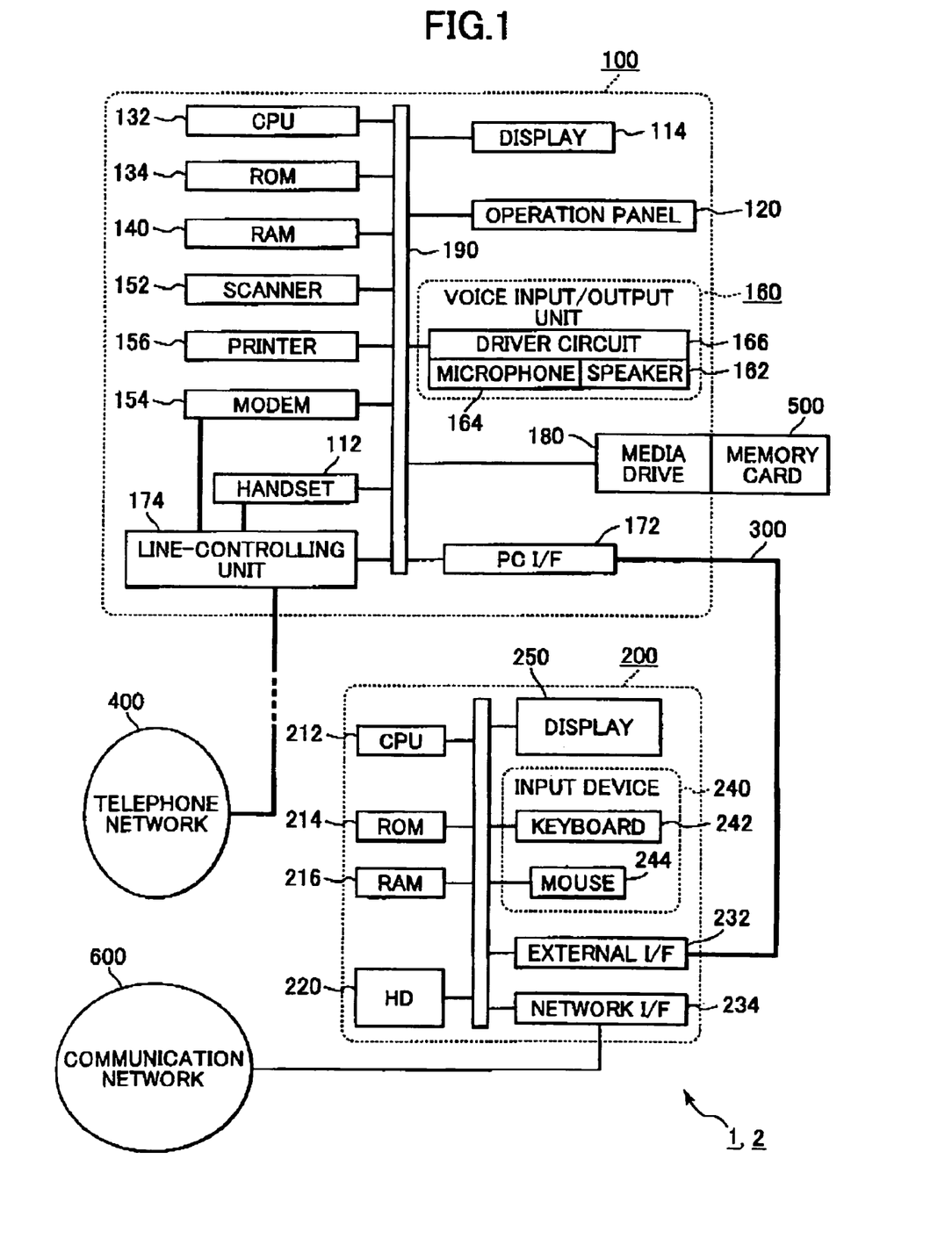
FIG. 1 is a block diagram showing the structure of a communication system according to the preferred embodiment.

As shown in FIG. 1, a communication system 1 includes a multifunction device 100 and a personal computer (hereinafter referred to as PC) 200 that are connected to each other and capable of performing data communications via a communications cable 300 connected to a PC interface (I/F) 172 and an external interface (I/F) 232.

The multifunction device 100 includes a telephone function for implementing a voice call via a telephone network 400; a fax function for transmitting and receiving image signals via the telephone network 400; and a number entry function for registering call destinations and transmission destinations used by the telephone function and fax function (identification numbers; telephone numbers in the preferred embodiment). In addition, the multifunction device 100 has a plurality of functions that can be implemented through the function implementing process described later (FIG. 8), including a scanner function for scanning an image on paper as image data; a printer function for printing an image on paper based on image data; a settings notification function for reporting settings for the various functions; and a remote setup function for receiving commands from an external source and modifying the content of settings related to the various functions without operations being performed on an operating panel 120 of the multifunction device 100.

Further, data indicating the content of settings for the various functions described above is recorded in the RAM 140. The CPU 132 executes processes for implementing these functions based on the content of settings indicated by this settings data.

In addition to various application programs, the HD 220 stores a scanner program, a setup program, and a printer program. These programs are provided for executing a process to use the scanner function (FIG. 2), a process to use the remote setup function (FIG. 5), and a process to use the printer function (FIG. 7) described later.

The network I/F 234 is an interface for connecting the PC 200 to a communication network 600 (local area network (LAN) in the preferred embodiment) 600.

<Process for Using the Scanner Function Executed by the CPU 212 of the PC 200>

Next, steps in a process for using the scanner function executed by the CPU 212 of the PC 200 will be described with reference to FIG. 2. This process begins when operations are performed on the input device 240 to start the scanner program. The process to use the scanner function directs the multifunction device 100 to scan an image on paper that is set in a scanning position on the multifunction device 100 end as image data. Accordingly, the user starts the scanner program when paper having an image to be scanned is set in the scanning position of the multifunction device 100.

First, the CPU 212 checks whether the PC 200 itself is properly connected to the multifunction device 100 (S110). In this process, the CPU 212 determines that the PC 200 is properly connected to the multifunction device 100 when the CPU 212 can access a shared area in the RAM 140 of the multifunction device 100.

If the CPU 212 determines that the multifunction device 100 is not properly connected in the process of S110 (S110: NO), then the CPU 212 issues a notification indicating that the multifunction device 100 is not properly connected (S120) and ends the process to use the scanner function. The notification in the process of S120 is issued by displaying a message on the display 250 indicating that the multifunction device 100 is not properly connected.

However, when the multifunction device 100 is properly connected in the process of S110 (S110: YES), then the CPU 212 generates scanner instruction data for acquiring the scanner capacity (S130). This scanner instruction data functions to request the multifunction device 100 for a notification of settings related to the scanner function.

Next, the CPU 212 stores the scanner instruction data generated in S130 in the shared area of the RAM 140 (S140). After this scanner instruction data is stored in the RAM 140, content notification data used to report the content of settings for the scanner function is generated and stored in the shared area of the RAM 140 in a function implementing process described later on the multifunction device 100 end. The content notification data is text data indicating such parameters as color type, resolution, scan area, brightness, and contrast, as shown in FIG. 3(a), as settings for the scanner function.

Next, the CPU 212 waits until content notification data has been stored in the shared area of the RAM 140 (S150: NO).

When content notification data has been stored in the shared area in the process of S150 (S150: YES), then the CPU 212 reads this content notification data from the shared area (S160).

Figure 4:
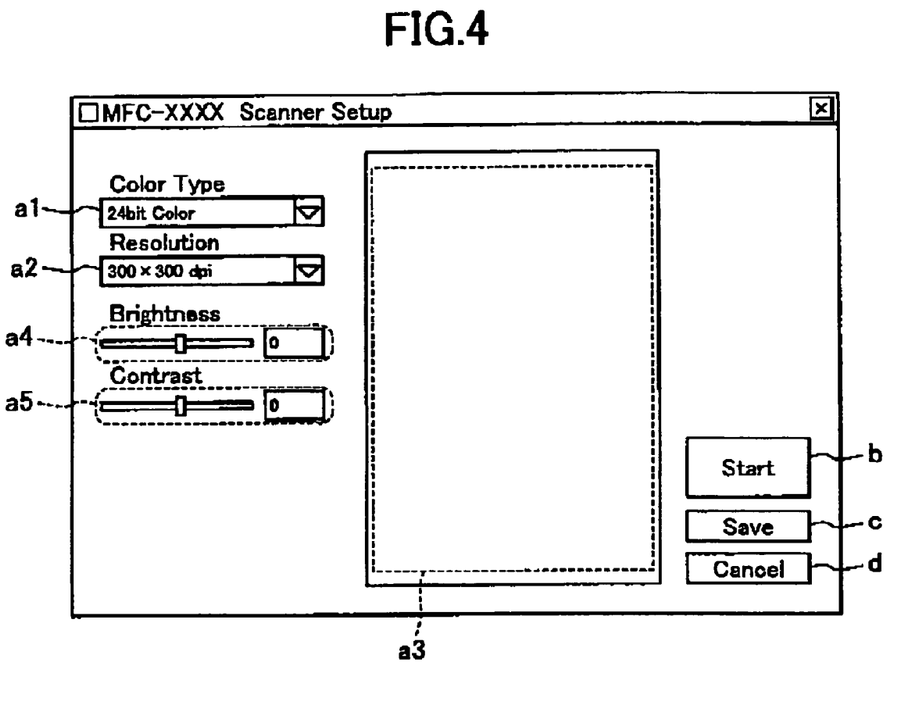
FIG. 4 shows a user interface window.

Next, a user interface (hereinafter referred to as user I/F) image for using the scanner function is displayed on the display 250 based on the content notification data read in S160 (S170). In this process a user I/F window such as that shown in FIG. 4 is displayed on the display 250. This user I/F window includes setting areas a for specifying various settings for the scanner function, a Start button b for starting the scanner function to scan an image as image data, a Save button c for storing image data scanned on the multifunction device 100 end for a later process, and a Cancel button d for canceling the process to use the scanner function. The setting areas a in this user I/F window include a color type a1, a resolution a2, a scan area a3, a brightness a4, and a contrast a5. These setting areas a specify the various settings indicated by the content notification data read in S160 (the area in the scan area a3 based on the content notification data is indicated by a dotted line).

After the user I/F window has been displayed, the user can perform operations on the input device 240 to modify (specify) settings in the setting areas a. Subsequently, the user can perform an operation to select (click) the Start button b or can perform an operation to select the Cancel button d.

Next, the CPU 212 deletes the content notification data read in S160 from the shared area in the RAM 140 (S180). Next, the CPU 212 determines whether an operation has been performed to select the Start button b in the user I/F window (S190).

If a process to select the Start button b has not been performed in S190 (S190: NO), then the CPU 212 determines whether an operation has been performed to select the Cancel button d (S200). If an operation to select the Cancel button d has not been performed in S200 (S200: NO), then the CPU 212 returns to the process of S190. If an operation to select the Start button b has been performed in S190 (S190: YES), then the CPU 212 generates scanner instruction data for starting the scanning process (S210). This scanner instruction data directs the scanner function to begin scanning the image. As with the content notification data read from the shared area in S160, the scanner instruction data is text data indicating parameters for the scanner function (modification content; see FIG. 3(a)).

Next, the CPU 212 stores the scanner instruction data generated in S210 in the shared area of the RAM 140 (S220). After this scanner instruction data is stored in the RAM 140, the multifunction device 100 performs a scanning process in the function implementing process described later (FIG. 8) to scan an image on paper set at the scanning position as image data. The image data scanned in this process is stored in the shared area of the RAM 140.

Next, the CPU 212 waits until image data is stored in the shared area of the RAM 140 (S230: NO). When image data is stored in the shared area in S230 (S230: YES), then the CPU 212 reads this image data from the shared area (S240).

Next, the CPU 212 displays content indicated by the image data read in S240 on the display 250 (S250). In this process, the content indicated by the image data read in S240 is displayed in the scan area a3 of the user I/F window described above. Once content indicated by the image data is displayed in this area, the user can perform operations on the input device 240 to select (click) either the Save button c or the Cancel button d.

Next, the CPU 212 determines whether an operation has been performed to select the Save button c in the user I/F window (S260). If an operation to select the Save button c has not been performed in S260 (S260: NO), then the CPU 212 determines whether an operation to select the Cancel button d has been performed (S270). If an operation to select the Cancel button d has not been performed in the process of S270 (S270: NO), then the CPU 212 returns to S260.

However, if an operation to select the Save button c has been performed in S260 (S260: YES), then the CPU 212 saves the image data read in S240 (S280). In this process, as when saving data with an application program well known in the art, the user inputs a filename and specifies a save location (a storage area on the HD 220 or the memory card 500) using the input device 240 to save the image data read in the process of S240.

After the process of S280 is completed or when an operation to select the Cancel button d has been performed in S270 (S270: YES), the CPU 212 deletes the image data read in S240 from the shared area of the RAM 140 (S290).

After completing the process in S290 or when an operation to select the Cancel button d has been performed in S200 (S200: YES), than the CPU 212 clears the display of the user I/F window (S300), which was displayed on the display 250 in S170, and ends the process to use the scanner function.

<Process to Use the Remote Setup Function Executed by the CPU 212 of the PC 200>

Next steps in a process to use the remote setup function executed by the CPU 212 of the PC 200 will be described with reference to FIG. 5. This process begins when an operation is performed on the input device 240 to start the setup program.

First, the CPU 212 determines whether the PC 200 itself is properly connected to the multifunction device 100 (S310). This process is similar to the process of S110 in FIG. 2. If the multifunction device 100 is not properly connected in S310 (S310: NO), then the CPU 212 issues a notification indicating that the multifunction device 100 is not properly connected (S320) and ends the process for using the remote setup function. The process of S320 is similar to the process of S120 in FIG. 2.

However, if the multifunction device 100 is properly connected in S310 (S310: YES), then the CPU 212 generates setup instruction data for acquiring the current settings (S330). The setup instruction data serves to request the multifunction device 100 for a report of settings for the various functions possessed by the multifunction device 100. In the preferred embodiment, the setup instruction data is text data such as that shown in FIG. 3(b), indicating settings for the scanner function such as color type, resolution, scan area, brightness, and contrast; settings for the printer function such as print quality, and contrast; settings for a telephone number entry function (set auto dial) such as entered numbers, number type indicating whether the number is a telephone number (TEL) or a fax number (FAX), and names (XXX, YYY, ZZZ).

Figure 3A:
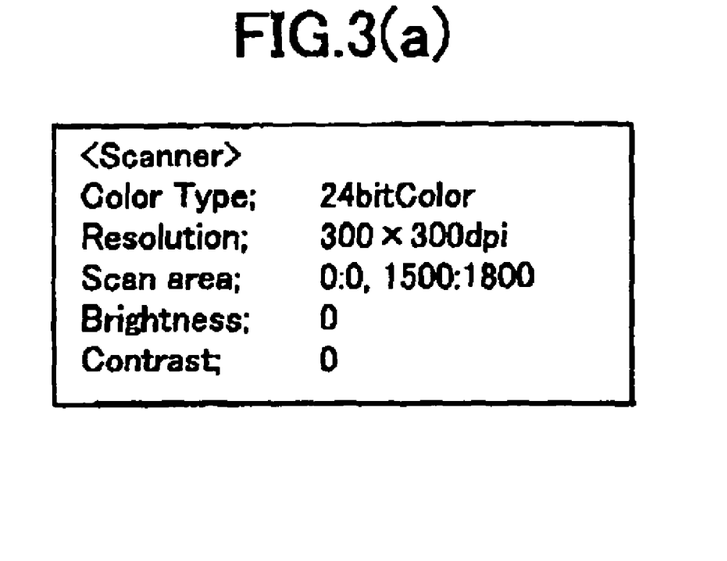
Figure 3B:
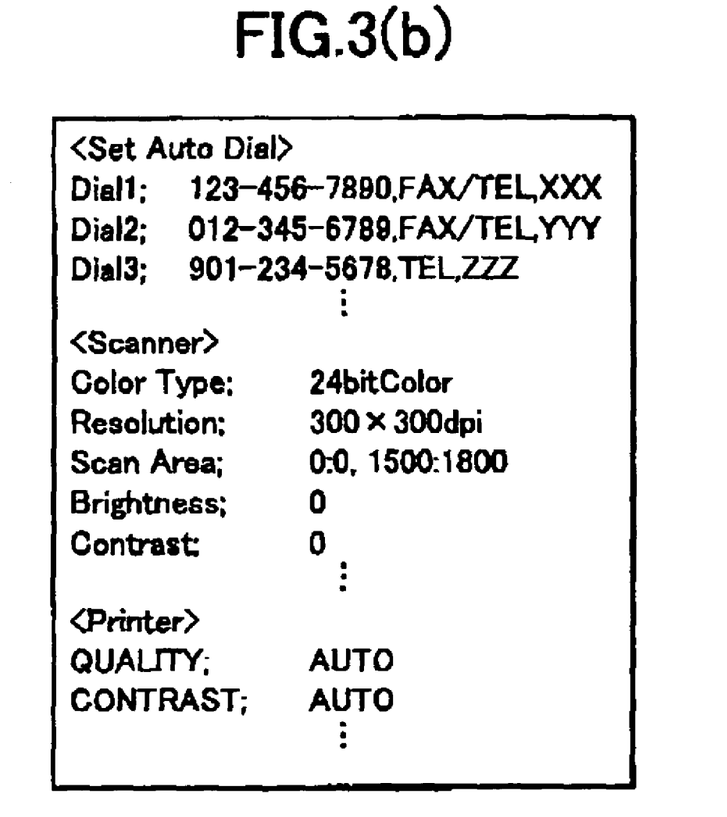

Next, the CPU 212 stores the setup instruction data generated in S330 in the shared area of the RAM 140 (S340). When the setup instruction data is stored in the RAM 140, the multifunction device 100 generates content notification data in the function implementing process (FIG. 8) described later to report the settings for each function (see FIG. 3(*b*)) and stores this data in the shared area of the RAM 140.

Next, the CPU 212 waits until content notification data is stored in the shared area of the RAM 140 (S350: NO). When content notification data is stored in the shared area in S350 (S350: YES), the CPU 212 reads this content notification data from the shared area (S360).

Figure 6:
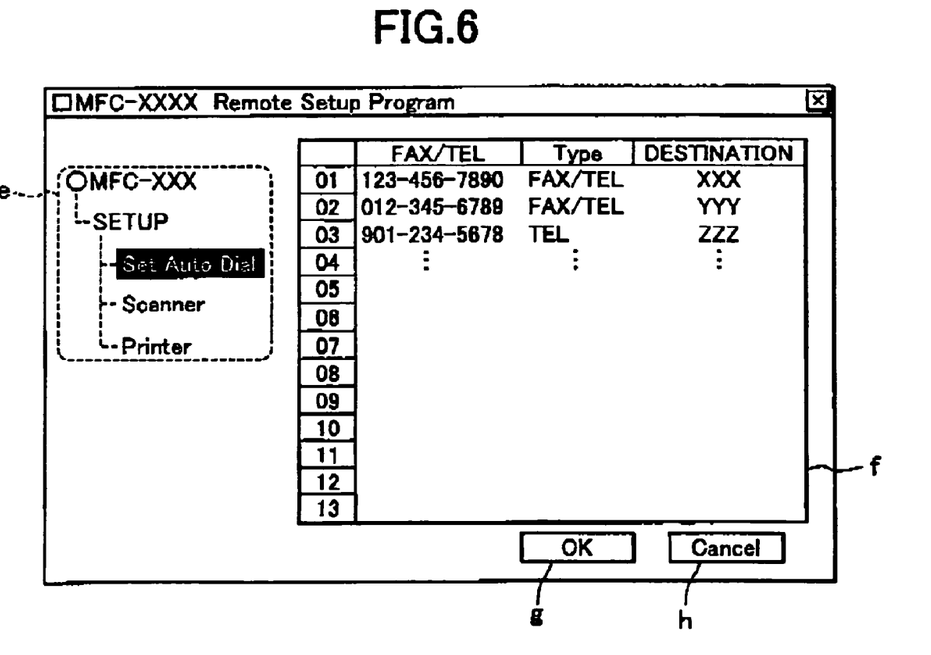
FIG. 6 shows the user interface window.

Next, the CPU 212 displays a user I/F window on the display 250 based on the content notification data read in S360, enabling modifications of settings for the various functions possessed by the multifunction device 100 (S370). In this process, a user I/F window such as that shown in FIG. 6 is displayed on the display 250. The user I/F window includes a directory structure e in which each function is displayed, an input space f for inputting setting entries for each function, an OK button g for ending input of settings, a Cancel button h for canceling the process to use the remote setup function, and the like. Here, the input space f for the function selected by an operation on the input device 240 is displayed in the user I/F window. At this time, the content indicated by the content notification data read in S360 is inputted into the input space f (FIG. 6 shows an example when set auto dial has been selected).

Once the user I/F window is displayed, the user can operate the input device 240 to display the input space f for any of the functions and to input setting entries for these functions. Subsequently, the user can perform an operation to select either the OK button g or the Cancel button h.

Next, the CPU 212 deletes the content notification data read in S360 from the shared area of the RAM 140 (S380). Next, the CPU 212 determines whether an operation has been performed to select the OK button g in the user I/F window (S390).

If an operation has not been performed to select the OK button g in S390 (S390: NO), then the CPU 212 determines whether an operation has been performed to select the Cancel button h (S400). If an operation to select the Cancel button h has not been performed in S400 (S400: NO), then the CPU 212 returns to S390.

However, if an operation to select the OK button g has been performed in S390 (S390: YES), then the CPU 212 generates setup instruction data for modifying settings (S410). The setup instruction data serves to modify settings for the various functions based on setting entries inputted in the input window f of the user I/F window. As with the content notification data read from the shared area in S360, the setup instruction data is text data that indicates settings (modifications) for the various functions.

Next, the CPU 212 stores the setup instruction data generated in S410 in the shared area of the RAM 140 (S420). When this setup instruction data has been stored in the RAM 140, the multifunction device 100 updates the settings for the various functions based on the setup instruction data in the function implementing process (FIG. 8) described later. Subsequently, end notification data indicating that the settings update has been completed for each function is stored in the shared area of the RAM 140. Next, the CPU 212 waits until end notification data has been stored in the shared area of the RAM 140 (S430: NO).

When end notification data has been stored in the shared area in S430 (S430: YES), the CPU 212 issues a notification indicating that updating of settings has been completed for each function on the multifunction device 100 end (S440). In the process of S440, the CPU 212 issues a notification by displaying on the display 250 a message indicating that the settings have been updated. Next, the CPU 212 deletes the end notification data stored in the shared area of the RAM 140 in S430 (S450).

After completing the process in S450 or when an operation selecting the Cancel button h has been performed in S400 (S400: YES), then the CPU 212 clears the user I/F window that was displayed on the display 250 in S370 (S460) and ends the process to use the remote setup function.

<Process to Use the Printer Function Executed by the CPU 212 of the PC 200>

Next, steps in a process to use the printer function executed by the CPU 212 in the PC 200 will be described with reference to FIG. 7. This process begins when an operation is performed on the input device 240 instructing that image data be printed through an application program installed on the HD 220.

First, the CPU 212 determines whether the PC 200 itself is properly connected to the multifunction device 100 (S510). This process is identical to the process of S110 of FIG. 2.

When the multifunction device 100 is not properly connected in S510 (S510: NO), the CPU 212 issues a notification indicating that the multifunction device 100 is not properly connected (S520) and ends the process to use the printer function. The process of S520 is identical to the process of S120 in FIG. 2.

However, if the multifunction device 100 is properly connected in S510 (S510: YES), then the CPU 212 generates print instruction data (S530). The print instruction data serves to direct the printer function to begin printing image data. This print instruction data is capable of identifying the image data for which the above application program has instructed a print.

Next, the CPU 212 stores the print instruction data generated in S530 in the shared area of the RAM 140 along with the image data to be printed as instructed by the above application program (S540). When this print instruction data is stored in the RAM 140, the multifunction device 100 prints images indicated by the image data on paper in the function implementing process (FIG. 8) described later. Subsequently, end notification data indicating that the printing has completed is stored in the shared area of the RAM 140.

Next, the CPU 212 waits until the end notification data has been stored in the shared area of the RAM 140 (S550: NO). When the end notification data has been stored in the shared area in S550 (S550: YES), the CPU 212 issues a notification indicating that the printing has completed on the multifunction device 100 end (S560). In the process of S550, the CPU 212 issues a notification by displaying a message indicating the printing has completed on the display 250.

The CPU 212 deletes the end notification data stored in the shared area of the RAM 140 in S550 (S570) and ends the process to use the printer function.

<Function Implementing Process Executed by the CPU 132 of the Multifunction Device 100>

Next, steps in the function implementing process executed by the CPU 132 of the multifunction device 100 will be described with reference to FIG. 8. The function implementing process is repeatedly executed while the multifunction device 100 is operating.

First, the CPU 132 determines whether scanner instruction data has been stored in the shared area of the RAM 140 (S610). The scanner instruction data is data stored in the shared area when either the process of S140 or S220 in FIG. 2 is performed on the PC 200 end.

If scanner instruction data has been stored in the shared area in S610 (S610: YES), then the CPU 132 reads this scanner instruction data from the shared area (S620).

Next, the CPU 132 determines whether the scanner instruction data read in S620 requests a notification of settings for the scanner function (S630). Scanner instruction data is stored in the shared area from the PC 200 end during the process of S140 or S220 of FIG. 2, but scanner instruction data stored in S140 requests the notification of settings for the scanner function, while scanner instruction data stored in S220 directs the scanner function to begin scanning an image.

If the scanner instruction data requests notification of settings for the scanner function in S630 (S630: YES), then the CPU 132 generates content notification data (S640). In this process, the CPU 132 generates content notification data such as that shown in FIG. 3(a) based on settings data stored in the RAM 140.

Next, the CPU 132 stores the content notification data generated in S640 in the shared area of the RAM 140 (S650). This content notification data is the data read by the PC 200 in S160 of FIG. 2.

However, if the scanner instruction data directs the scanner function to begin scanning an image in S630 (S630: NO), then the CPU 132 controls the scanning unit 152 to scan an image from paper set in the scanning position as image data (S660).

Next, the CPU 132 stores the image data scanned in S660 in the shared area of the RAM 140 (S670). This image data is the data read and deleted by the PC 200 in the processes of S240 and S290 in FIG. 2.

After completing the process of S670 or the process of S650, the CPU 132 deletes the scanner instruction data stored in the shared area in S610 (S680) and returns to S610.

However, if scanner instruction data has not been stored in the shared area in the process of S610 described above (S610: NO), then the CPU 132 determines whether setup instruction data has been stored in the shared area (S710). This setup instruction data is stored in the shared area when the PC 200 performs the process of S340 or S420 in FIG. 5.

If setup instruction data has been stored in the shared area in S710 (S710: YES), then the CPU 132 reads this setup instruction data from the shared area (S720).

Next, the CPU 132 determines whether the setup instruction data read in S720 requests notification of settings for the various functions (S730). The setup instruction data is stored in the shared area by the PC 200 in the process of S340 or S420 of FIG. 5, but the setup instruction data stored in S340 requests notification of settings for the various functions, while the setup instruction data stored in S420 requests modification of settings for the various functions.

When the setup instruction data requests notification of settings for the various functions in S730 (S730: YES), the CPU 132 generates content notification data (S740). In this process, the CPU 132 generates content notification data such as that shown in FIG. 3(b) based on the settings data stored in the RAM 140.

Next, the CPU 132 stores the content notification data generated in S740 in the shared area of the RAM 140 (S750). This content notification data is the data read by the PC 200 in S360 of FIG. 5.

However, if the setup instruction data requests modifications of settings for the various functions (S730: NO), then the CPU 132 modifies settings for the functions based on the setup instruction data stored in the shared area in S710 (S760). In this process, the CPU 132 modifies settings for the functions by changing various parameters indicated in the settings data stored in the RAM 140 to parameters indicated by the setup instruction data. The identification number in the parameters indicated by the settings data is reset to the identification number in the parameters indicated by the setup instruction data.

Next, the CPU 132 stores end notification data in the shared area of the RAM 140 indicating that modification of the settings is completed (S770). This end notification data is the data that the PC 200 reads and deletes in the processes of S430 and S450 of FIG. 5.

After completing the process of S770 or the process of S750, the CPU 132 deletes the setup instruction data stored in the shared area in S710 (S780) and returns to S610.

Further, if neither scanner instruction data nor setup instruction data is stored in the shared area in the process of S610 described above (S610: NO, S710: NO), then the CPU 132 determines whether print instruction data has been stored in the shared area (S810). This print instruction data is stored in the shared area when the PC 200 performs the process of S540 in FIG. 7.

If print instruction data has been stored in the shared area in S810 (S810: YES), then the CPU 132 reads the print instruction data from the shared area (S820).

Next, the CPU 132 controls the printing unit 156 according to the print instruction data read in S820 to print an image on paper based on the image data (S830). Since the print instruction data can identify image data stored in the shared area together with the print instruction data as described above, the CPU 132 reads the image data identified by the print instruction data from the shared area and directs the printing unit 156 to print an image on paper based on this image data.

Next, the CPU 132 stores end notification data in the shared area of the RAM 140 indicating that the printing process has completed (S840). This end notification data is the data that the PC 200 reads and deletes in the processes of S550 and S570 of FIG. 7.

After completing the process of S840, the CPU 132 deletes the print instruction data and image data stored in the shared area in S810 (S850), and returns to S610.

Further, in the process of S610 described above, if none of the scanner instruction data, setup instruction data, or print instruction data have been stored in the shared area (S610: N0, S710: NO, S810: NO), then the CPU 132 returns to S610.

Figure 7:
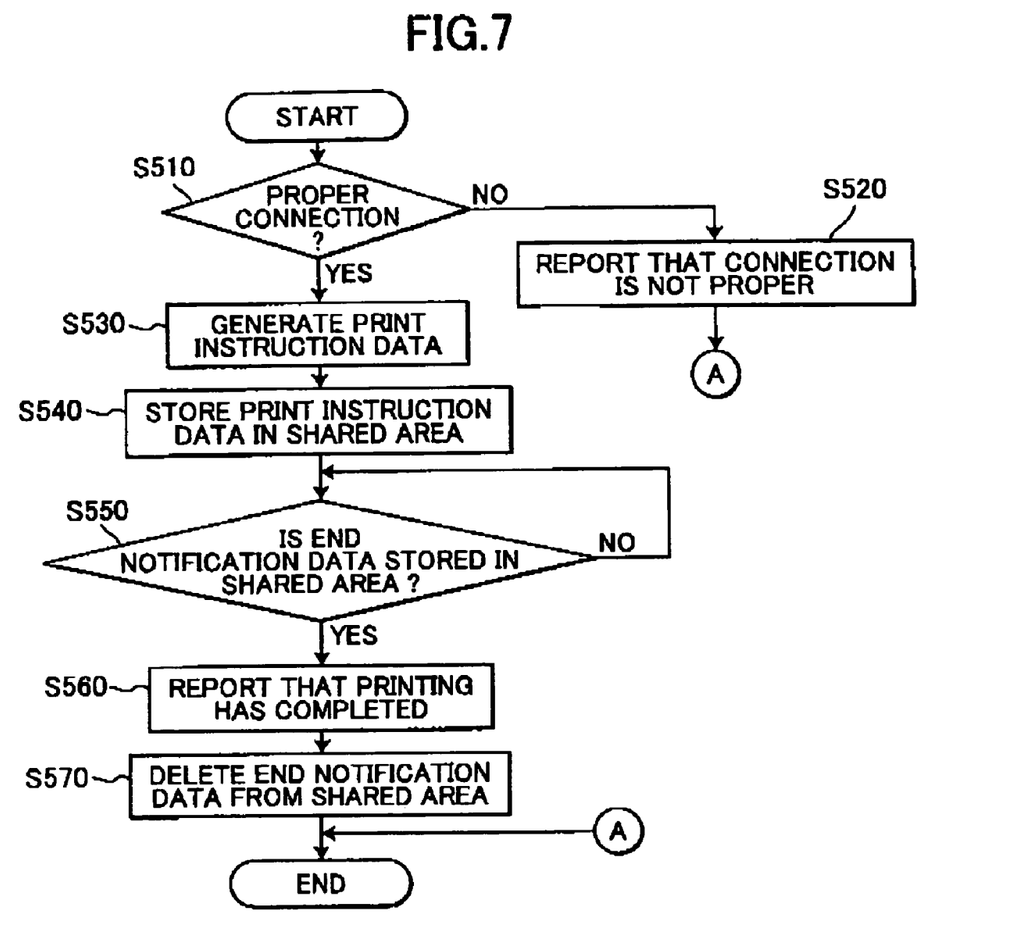
FIG. 7 is a flowchart showing steps in a process to use the printer function.
Figure 8:
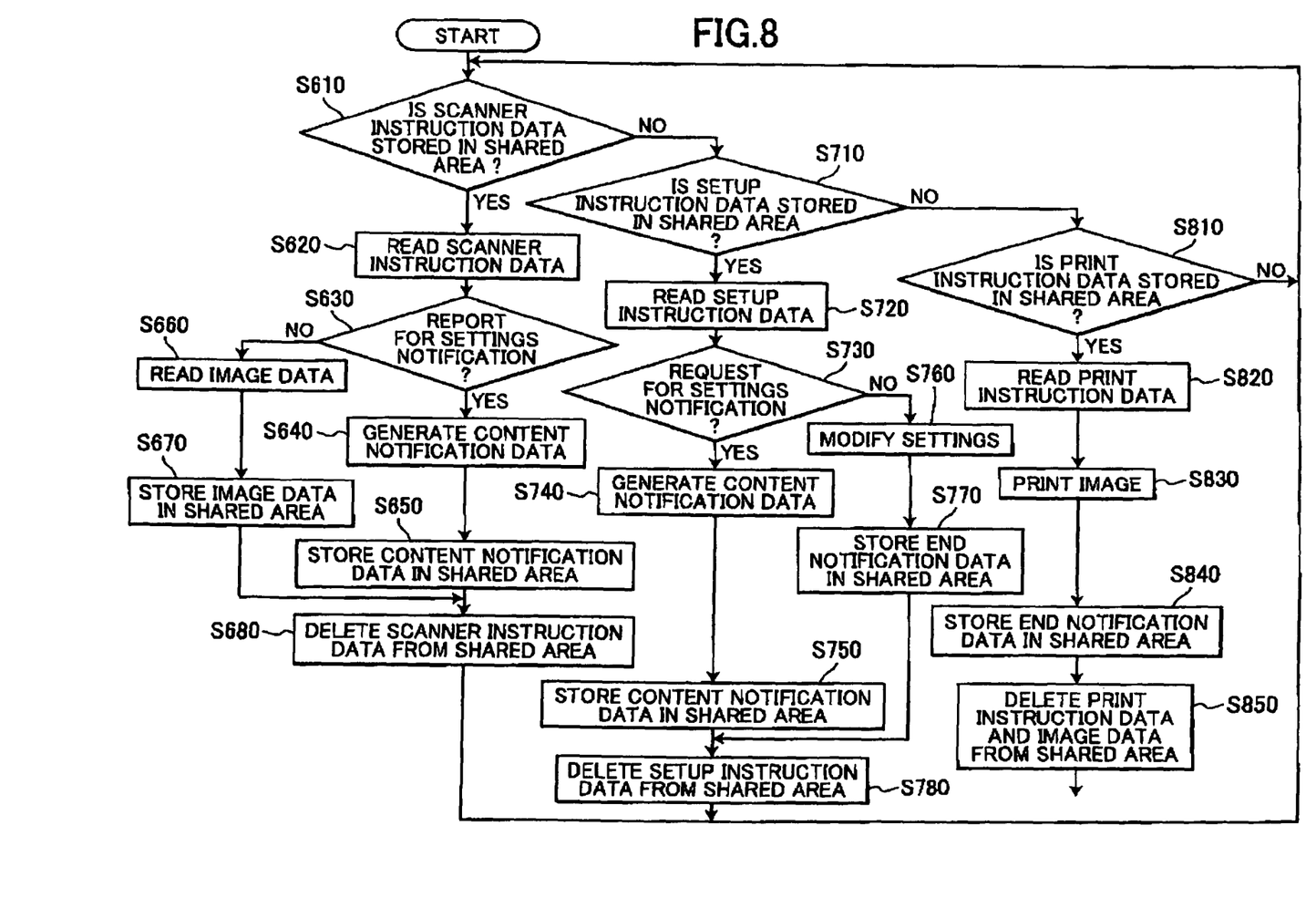
FIG. 8 is a flowchart showing steps in a function implementing process.

The multifunction device 100 provided in the communication system 1 executes a process in the function implementing process of FIG. 8 for implementing a function indicated by instruction data when such instruction data is stored in the shared area of the RAM 140. Here, the PC 200 connected to the multifunction device 100 can recognize the shared area of the RAM 140 in which the instruction data is stored as a storage area that can be accessed with the file system function provided standard in the operating system. Accordingly, operations of the multifunction device 100 can be controlled from the PC 200 end simply by storing instruction data in the shared area using the operating system (refer to FIG. 2, FIG. 5, and FIG. 7), thereby eliminating the need for a special device driver to control operations of the multifunction device 100.

Figure 2A:
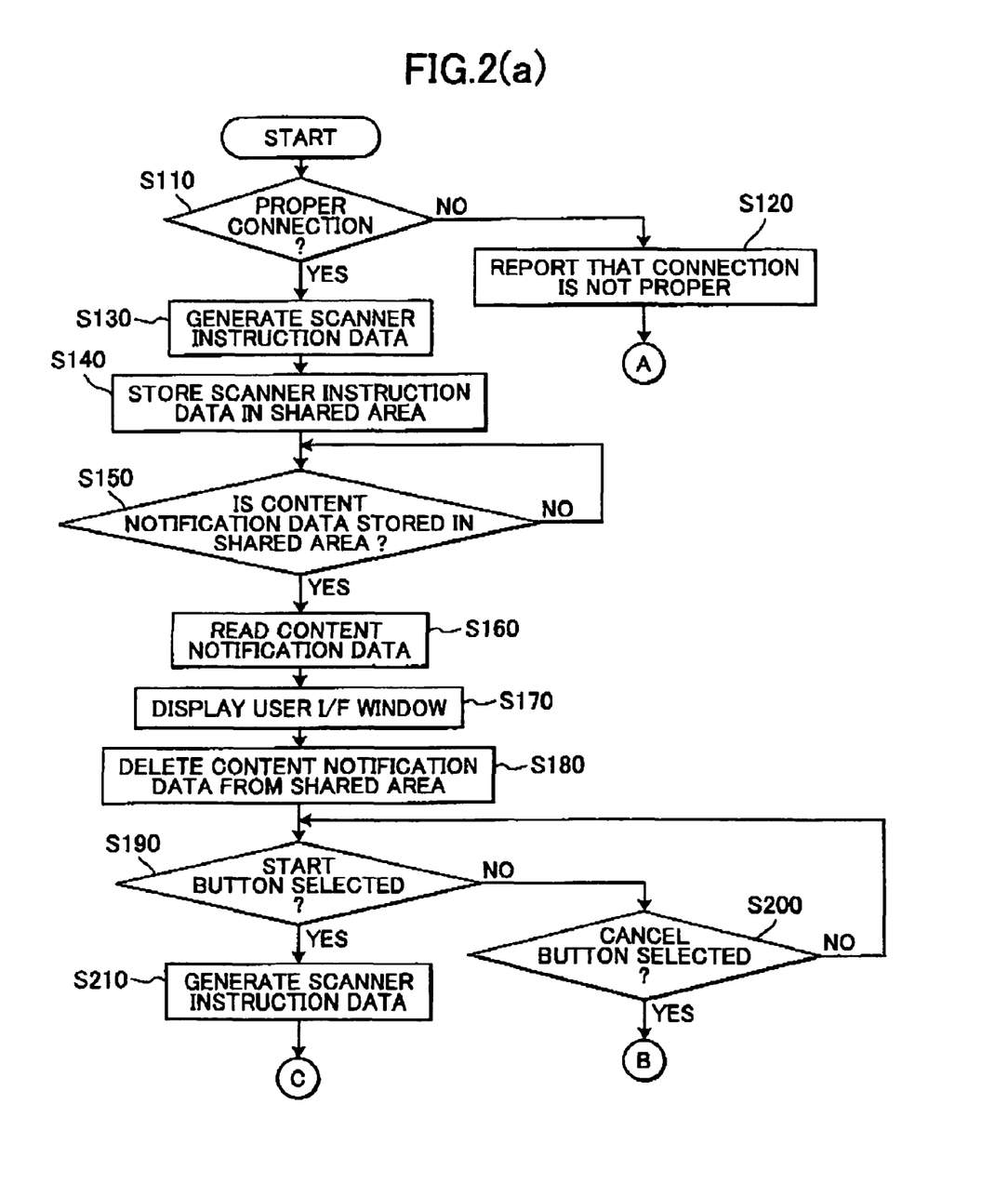
Figure 2B:
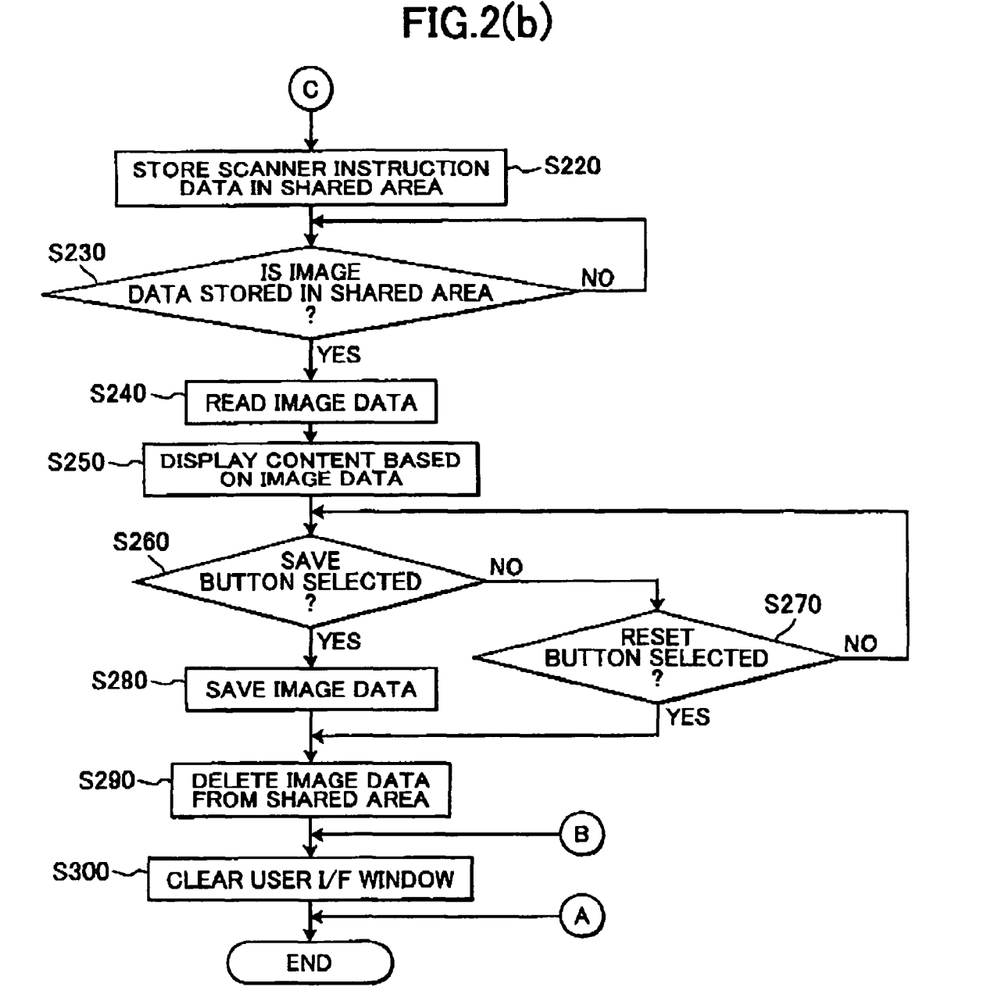
Figure 5:
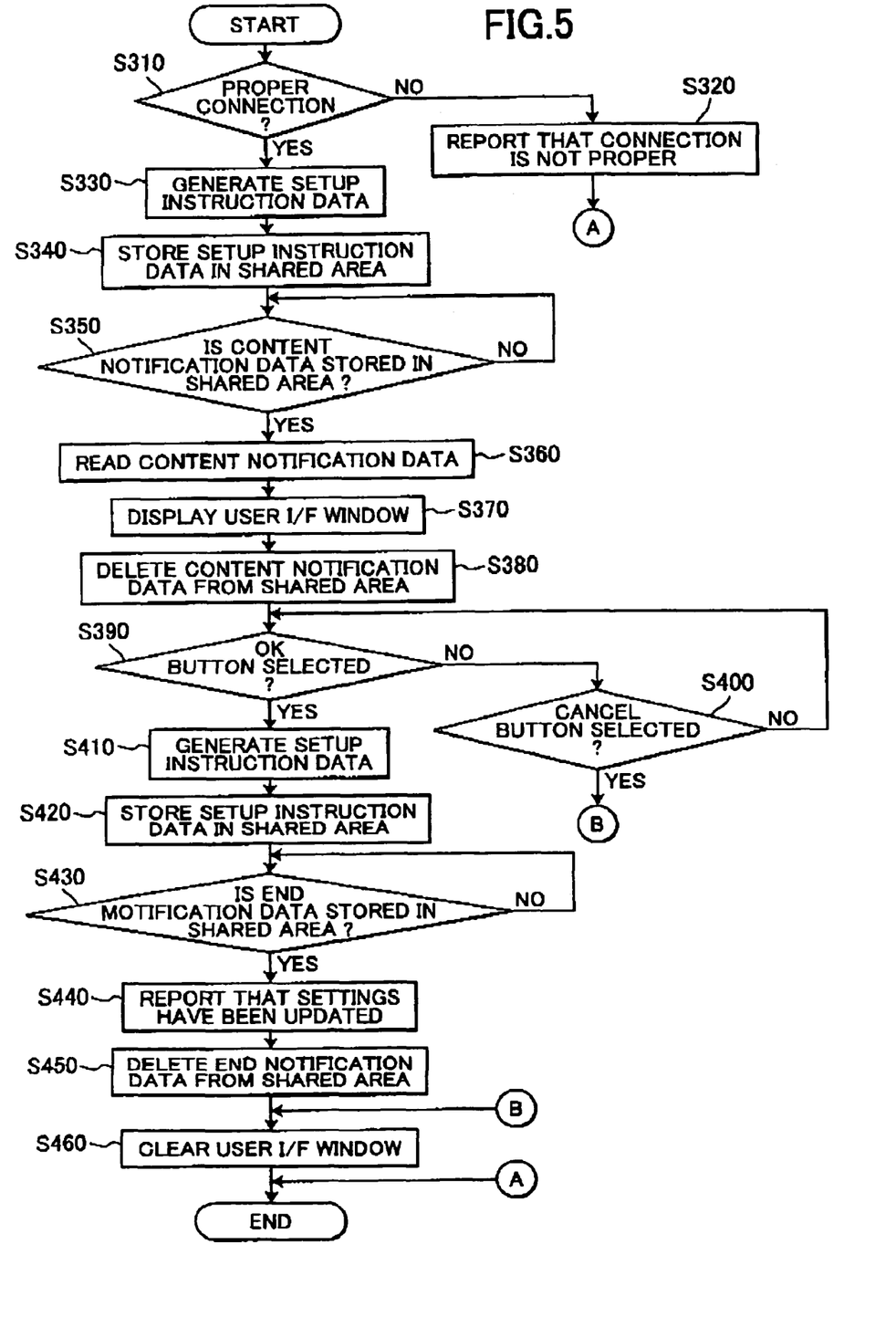
FIG. 5 is a flowchart showing steps in a process to use the remote setup function.

Hence, by incorporating programs for executing the processes of FIG. 2, FIG. 5, and FIG. 7, the functions of the multifunction device 100 can be used by the PC 200 thereafter without need of a device driver. Accordingly, troublesome operations involved with incorporating device drivers can be eliminated, thereby greatly lightening the load on the user in operations required to use the multifunction device 100.

Further, since the operations of the multifunction device 100 can be controlled by a function that is standard in the operating system as described above, only the above described programs need be developed and provided when developing and providing the multifunction device 100, thereby eliminating costs required to develop a device driver.

In particular, a special device driver and a function for generating the aforementioned instruction data was conventionally not developed nor provided for operating systems having few users because of the difficulty in recovering production costs for such development and provision. Therefore, personal computers running such operating systems could not use the functions possessed by the multifunction device 100. However, by developing and providing the programs described above for even those operating systems with few users, the aforementioned production costs can be reduced, and personal computers running such operating systems can also use the functions of the multifunction device 100.

Further, after executing functions in the function implementing process of FIG. 8, the instruction data used to initiate execution of the function is deleted from the shared area of the RAM 140 (processes of S680, S780, and S850). Since a process is executed to implement the function indicated by the instruction data during this function implementing process when such instruction data is stored in the shared area of the RAM 140, the same process might be repeatedly executed undesirably based on the same instruction data if the instruction data is left in the shared area. However, by deleting the instruction data used to initiate execution of the above functions, it is possible to prevent the same process from being repeatedly executed based on the same instruction data. Further, since the instruction data itself is deleted from the shared area, the problem of unnecessary data occupying the RAM 140 is avoided, and the shared area of the RAM 140 can be used effectively.

Further, scanning of an image as image data is begun in the process of S660 in FIG. 8 after scanner instruction data is stored in the shared area of the RAM 140. Hence, in the process of S220 of FIG. 2, the PC 200 controls operations of the scanning unit 152 in the multifunction device 100 simply by storing scanner instruction data in the shared area of the RAM 140 via the operating system, enabling use of the scanner function.

Further, by storing image data read in S660 in the shared area of the RAM 140 in S670 of FIG. 8, the PC 200 can freely access the image data.

Further, when print instruction data is stored in the shared area of the RAM 140, images based on image data stored in the shared area along with the print instruction data can be printed on paper in the process of S830 of FIG. 8. Accordingly, operations of the printing unit 156 in the multifunction device 100 can be controlled on the PC 200 end simply by storing print instruction data in the shared area of the RAM 140 via the operating system, enabling use of the printer function.

Further, after an image is printed in S830 of FIG. 8, both the print instruction data used to initiate printing of the image in S850 and the image data itself are deleted from the shared area of the RAM 140. Since image data is generally larger in volume than simple data such as print instruction data, it is desirable to delete such high volume data from the shared area, after the data is used to implement the printer function, in order to effectively use the shared area of the RAM 140.

Further, after storing setup instruction data requesting a report of settings or scanner instruction data requesting a report of settings in the shared area of the RAM 140, content notification data indicating parameters of the settings requested by the instruction data can be stored in the shared area of the RAM 140 in the processes of S740 and S750 or S640 and S650 of FIG. 8. After the PC 200 end stores setup instruction data or scanner instruction data in the shared area of the RAM 140 via the operating system (the processes of S140 in FIG. 2 and S340 in FIG. 5), the PC 200 end can display content indicated by content notification data stored in the shared area in a user I/F window (processes of S170 and S370). In this way, the function on the multifunction device 100 end for reporting settings (settings notification function) can be used through the steps of storing the setup instruction data or scanner instruction data in the shared area of the RAM 140 via the operating system on the PC 200 end, and subsequently displaying the content indicated by content notification data stored in the shared area in a user I/F window.

Further, after setup instruction data requesting modifications of settings is stored in the shared area of the RAM 140, settings of the relevant functions can be modified to settings indicated by the setup instruction data in the process of S760 of FIG. 8. Accordingly, the remote setup function for externally modifying settings related to the functions possessed by the multifunction device 100 without performing direct operations can be used by storing the setup instruction data in the shared area of the RAM 140 via the operating system on the PC 200 end (process of S420 in FIG. 5).

Further, the PC 200 included in the communication system 1 having the construction described above can receive operations from the user and generate instruction data through the processes of S130 and S210 in FIG. 2, the processes of S330 and S410 in FIG. 5, and the process of S530 in FIG. 7. The PC 200 can store this instruction data in the shared area of the RAM 140 in the multifunction device 100 and can use the various functions possessed by the multifunction device 100 through the processes of S140, S220, S340, S420, and S540.

Further, when image data has been stored in the shared area of the RAM 140 in S230 of FIG. 2, this image data can be saved in the process of S280. Accordingly, the image data can be stored on the PC 200 end without the user intentionally performing an operation to access the image data.

Further, after image data stored on the multifunction device 100 end (shared area of the RAM 140) is recorded on the PC 200 end (HD 220) in S290 of FIG. 2, this image data can be deleted from the multifunction device 100 end. Hence, it is possible to avoid large volumes of image data occupying the shared area of the multifunction device 100 end (RAM 140), thereby effectively using the shared area on the multifunction device 100 end.

When the user I/F window is displayed in the process of S170 in FIG. 2 or S370 in FIG. 5, the content notification data used to display this user I/F window can be deleted from the multifunction device 100 (shared area of the RAM 140). Accordingly, it is possible to prevent unnecessary data from occupying the shared area in the multifunction device 100 (RAM 140), thereby effectively using the shared area on the multifunction device 100 end.

While the invention has been described in detail with reference to specific embodiments thereof, it would be apparent to those skilled in the art that many modifications and variations may be made therein without departing from the spirit of the invention, the scope of which is defined by the attached claims.

For example, in the embodiment described above, the construction of the data processing device of the present invention is applied to the multifunction device 100. However, it is obvious that the present invention can be applied to other devices, provided that the device can implement one or more functions.

Further, the process to use the scanner function in FIG. 2 is configured to begin when the scanner program is launched through the inputting unit 240. However, this process can be configured to start when called from another application program (such as image creating software). In this case, a process may be executed after image data is read in S240 to transfer this image data to the aforementioned application program (to enable the application program to use the data) in place of the processes from S250 to S290.

Further, the processes shown in each flowchart for the preferred embodiment are executed by a computer system that includes the CPU 132 in the multifunction device 100 and the CPU 212 in the PC 200. However, some or all of these processes may be executed by a separate computer system connected to the multifunction device 100 and PC 200 via wired or wireless signal transmission lines.

In the multifunction device 100 of the preferred embodiment described above, processes indicated in the flowcharts are executed according to programs stored in the ROM 134. However, the aforementioned programs may be stored on the memory card 500, and the processes indicated in the flowcharts may be executed according to these programs stored on the memory card 500 while the memory card 500 is mounted in the media drive 180.

Further, in the PC 200 of the preferred embodiment, the processes indicated in the flowcharts are executed according to programs stored on the HD 220. However, if the PC 200 can perform data input and output with a recording medium such as a floppy disk or a memory card, the PC 200 may be configured to execute the processes indicated in the flowcharts based on the above-mentioned programs stored on this recording medium.

Further, in the preferred embodiment, the telephone network 400 may be a public switched telephone network (PSTN) or an IP telephone network.

Further, in the preferred embodiment, the multifunction device 100 is configured to transmit and receive (facsimile communications) image signals via the telephone network 400. However, the multifunction device 100 may be configured to perform facsimile communications via the Internet when capable of performing data communications via the Internet.

Further, in the preferred embodiment, various data is exchanged between the multifunction device 100 and the PC 200 using the shared area in the RAM 140 of the multifunction device 100. However, this exchange of data may also be performed through the memory card 500 mounted in the media drive 180. In this case, the "shared area of the RAM 140" description in the preferred embodiment should be replaced by the "memory card 500 mounted in the media drive 180."

Further, in the preferred embodiment, the PC 200 is provided with functions for generating instruction data through a scanner program, setup program, and printer program. However, the present invention is not limited to any particular construction for providing the PC 200 with a function to generate instruction data. For example, the multifunction device 100 may use data that can be generated by another application program incorporated in the PC 200 (such as a text editor) as the aforementioned instruction data. By operating the input device 240 of the PC 200, the user can generate instruction data through the application program and store this instruction data on the multifunction device 100 end (shared area of the RAM 140). This construction eliminates the need for the programs described above, thereby further reducing development costs.

In the preferred embodiment, the user is notified of settings indicated by content notification data by displaying the user I/F window in the processes of S170 in FIG. 2 and S370 in FIG. 5. However, other configurations may be employed to report settings indicated by the content notification data. For example, in the processes of S170 and S370 the settings indicated by the content notification data may be displayed in a message of a dialog box separate from the user I/F window or may be outputted as voice via the speaker.

Further, in the preferred embodiment, the same process is prevented from being repeated undesirably based on the same instruction data by deleting the instruction data used to implement each function from the shared area of the RAM 140 in the processes of S680, S780, and S850 of FIG. 8. However, another configuration may be employed to prevent such undesirable repeated execution of the same process based on the same instruction data. For example, the instruction data used to implement the functions may be modified in the processes of S680, S780, and S850 to indicate that the function has already been implemented (instruction data modification commanding unit), and the processes of S610, S710, and S810 may be configured to determine not only whether instruction data is stored in the shared area, but also whether the function has already been implemented. With this construction, "indicating that the function has already been implemented" may be achieved, for example, by overwriting a portion of the instruction data with content indicating that the function has already been implemented or by appending data to the instruction data indicating that the function has already been implemented.

This construction can prevent the same process from being undesirably repeated based on the same instruction data.

Further, in the preferred embodiment, the PC 200 stores print instruction data and image data as separate data in the RAM 140 in S540 of FIG. 7. However, the PC 200 may store the image data itself as print instruction data in the shared area of the RAM 140 in S540. In this case, when image data is stored in the shared area of the RAM 140 in S810 of FIG. 8, the multifunction device 100 can be configured to perform the processes beginning from S820 while treating this image data as print instruction data.

Further, in the preferred embodiment, the scanner function, printer function, settings notification function, and remote setup function possessed by the multifunction device 100 can be used from the PC 200 end. However, it is possible to make other functions possessed by the multifunction device 100 usable from the PC 200 end.

What is claimed is:

1. A data processing device having one or more functions, the device comprising:
   a storing unit that stores various types of data, the storing unit being capable of being recognized, as an external storage device, by an external personal computer;
   a function implementing unit; and
   an interface that:
      is structured to be connected to both the external personal computer and the function implementing unit;
      interfaces the function implementing unit with the storing unit such that the function implementing unit can read and write various types of data; and
      when the external personal computer is connected to the interface, interfaces the external personal computer with the storing unit such that the external personal computer can read and write the various types of data from and to the storing unit without being recognized by the function implementing unit,
   wherein the function implementing unit, after the instruction data is stored in the storing unit via the interface by the external personal computer without being recognized by the function implementing unit, automatically reads the stored instruction data from the storing unit via the interface, and determines a process to implement one of the one or more functions corresponding to the read instruction data and executes the determined process.

2. The data processing device according to claim 1, further comprising an instruction data deletion commanding unit that deletes the instruction data from the storing unit after the function implementing unit implements a function indicated by the instruction data.

3. The data processing device according to claim 2, further comprising a reading unit that implements a scanner function to read a prescribed image as image data, wherein the function implementing unit instructs the reading unit to read an image as image data when read instruction data for instructing that an image be read using the scanner function is stored in the storing unit.

4. The data processing device according to claim 2, further comprising a printing unit that implements a printer function to print an image on a printing medium based on image data, wherein the function implementing unit instructs the printing unit to print an image based on the image data when print instruction data indicating that an image be printed with the printer function and the image data are stored in the storing unit.

5. The data processing device according to claim 2, wherein when notification instruction data for requesting a notification of settings related to one of the one or more functions is stored in the storing unit, the function implementing unit stores content notification data in the storing unit indicating settings related to a function for which the notification instruction data requests notification.

6. The data processing device according to claim 2, wherein when modification instruction data for requesting an update of settings related to one of the one or more functions is stored in the storing unit, the function implementing unit updates settings for a function instructed to be updated by the modification instruction data.

7. The data processing device according to claim 1, further comprising a reading unit that implements a scanner function to read a prescribed image as image data, wherein the function implementing unit instructs the reading unit to read an image as image data when read instruction data for instructing that an image be read using the scanner function is stored in the storing unit.

8. The data processing device according to claim 7, wherein the function implementing unit instructs the reading unit to read the image and produce the image data representing the image and thereafter stores the image data read by the reading unit in the storing unit.

9. The data processing device according to claim 1, further comprising a printing unit that implements a printer function to print an image on a printing medium based on image data, wherein the function implementing unit instructs the printing unit to print an image based on the image data when print instruction data indicating that an image be printed with the printer function and the image data are stored in the storing unit.

10. The data processing device according to claim 1, wherein when notification instruction data for requesting a notification of settings related to one of the one or more functions is stored in the storing unit, the function implementing unit stores content notification data in the storing unit indicating settings related to a function for which the notification instruction data requests notification.

11. The data processing device according to claim 1, wherein when modification instruction data for requesting an update of settings related to one of the one or more functions is stored in the storing unit, the function implementing unit updates settings for a function instructed to be updated by the modification instruction data.

12. The data processing device according to claim 1, wherein the storing unit includes a random access memory.

13. The data processing device according to claim 1, wherein the function implementing unit first recognizes the instruction data when the function implementing unit reads the stored instruction data via the interface after storing the stored instruction data.

* * * * *